United States Patent
Marshall

[11] Patent Number: 5,831,148
[45] Date of Patent: Nov. 3, 1998

[54] CAPACITOR BANK LIQUID DIELECTRIC LEAK SENSOR APPARATUS

[76] Inventor: Ralph B. Marshall, 337 Norridgewock Rd., Fairfield, Me. 04937

[21] Appl. No.: 932,309

[22] Filed: Sep. 17, 1997

[51] Int. Cl.⁶ .......................... G08B 21/00; H01M 10/48; F21B 33/03; G01M 03/04
[52] U.S. Cl. .................... 73/40; 73/49.2; 429/90
[58] Field of Search ............... 73/40, 49.2; 340/605; 429/90–91

[56] References Cited

U.S. PATENT DOCUMENTS

| | | | |
|---|---|---|---|
| 3,711,746 | 1/1973 | King | 317/258 |
| 4,034,598 | 7/1977 | Ames | 73/40 |
| 4,103,291 | 7/1978 | Howe et al. | 340/522 |
| 4,601,201 | 7/1986 | Oota et al. | 73/304 C |
| 4,618,910 | 10/1986 | Strange et al. | 361/275 |
| 4,823,116 | 1/1973 | Kitchen, III et al. | 340/603 |
| 4,875,359 | 10/1989 | Atriba | 73/40 |
| 4,901,751 | 2/1990 | Story et al. | 137/312 |
| 5,245,860 | 9/1993 | Chang et al. | 73/40 |
| 5,339,676 | 8/1994 | Johnson | 73/40 |
| 5,656,999 | 8/1997 | Campbell | 340/605 |

*Primary Examiner*—Hezron E. Williams
*Assistant Examiner*—J. David Wiggins
*Attorney, Agent, or Firm*—Charles J. Prescott

[57] ABSTRACT

A capacitor bank leak sensor apparatus for preventing damage or failure of the capacitor bank of the type which includes a plurality or array of spaced apart dielectric liquid filled capacitors positioned within a housing. The failure prediction/prevention apparatus includes a collecting tray or trough positioned within the housing and below the capacitors which is adapted in size and shape to catch and collect all dielectric liquid which leaks from any of the capacitors. All leaked liquid dielectric is drained into a container of a sensor device which activates viewable and/or audible indicia when a predetermined quantity of dielectric liquid has been collected in the container, the predetermined quantity preferably being less than that which would likely result in failure of one of the leaking capacitors.

12 Claims, 2 Drawing Sheets

CAPACITOR BANK LIQUID DIELECTRIC LEAK SENSOR APPARATUS

BACKGROUND OF THE INVENTION

1. Scope of Invention

This invention relates generally to capacitor banks of electrical power delivery systems of the type having liquid electrolyte filled capacitors, and more particularly to a dielectric leak sensor apparatus which produces an indicia that a non-critical amount of dielectric liquid has leaked from one or more of the capacitors.

2. Prior Art

Large industrial capacitor banks are typically used within electric power delivery systems. These capacitor banks are used to maintain predetermined levels of voltage electrical potential while the system is in operation. The most common of these capacitor banks utilize a series or array of capacitors which are filled with a dielectric liquid which is sealed within each of the capacitors. A common failure mode of such capacitor banks occurs when an individual capacitor unit fails caused by the leakage of the dielectric liquid therefrom. This leakage typically occurs around the area of one of the porcelain bushings of the capacitor.

A common means for detecting such dielectric liquid leakage is either by physically checking each of the housing interiors of each capacitor bank on a frequent basis by a qualified technician or by the after-the-fact inspection of a capacitor bank which has failed thus causing an electrical imbalance within the capacitor bank by using electrical measuring instruments. Of course, failure detection in this form would have already caused an electrical system failure, and in some extreme cases, the loss of an entire capacitor bank and the disruption of electric power delivery from the system. Such a catastrophic failure within a capacitor bank would likely include severe electrical arcing and/or fire within the capacitor bank. Economic loss from such a failure is substantial and occurs quite frequently.

The present invention provides an extremely simple, yet unique apparatus which is easily retrofitted to existing capacitor banks, and well as being easily incorporated into those capacitor banks which are currently being manufactured. The apparatus collects and gathers virtually all dielectric liquid which leaks from one or more of the capacitors within a capacitor bank. This leaked and collected dielectric liquid is then funneled or directed by gravity into a container of a sensor which produces viewable or audible indicia or a system shut-down signal when the quantity of leaked and collected dielectric liquid reaches a certain predetermined critical level, which predetermined level is substantially less than that required to have been leaked from a single capacitor bank leading to its failure. By this arrangement, a system operator would quickly be advised of leakage of dielectric liquid within a particular capacitor bank well before any internal damage or failure occurs.

BRIEF SUMMARY OF THE INVENTION

This invention is directed to a capacitor bank leak sensor apparatus for preventing damage or failure of the capacitor bank of the type which includes a plurality or array of spaced dielectric liquid filled capacitors positioned within a housing. The apparatus includes a collecting tray or trough positioned within the housing and below the capacitors which is adapted in size and shape to catch and collect all dielectric liquid which leaks form any of the capacitors. All leaked liquid dielectric is drained into a container of a sensor device which activates viewable and/or audible indicia when a predetermined quantity of dielectric liquid has been collected in the container, the predetermined quantity preferably being less than that which would likely result in failure of one of the leaking capacitors.

It is therefore an object of this invention to provide a capacitor bank dielectric leak sensor apparatus which prevents internal damage to the capacitor bank as a result of the leakage of liquid dielectric from one or more of the capacitors thereof.

It is another object of this invention to provide an apparatus which is retroactively installable into existing capacitor banks of electrical power delivery systems for preventing failure of the capacitor bank.

In accordance with these and other objects which will become apparent hereinafter, the instant invention will now be described with reference to the accompanying drawings.

DETAILED DESCRIPTION OF THE INVENTION

Figure 1:
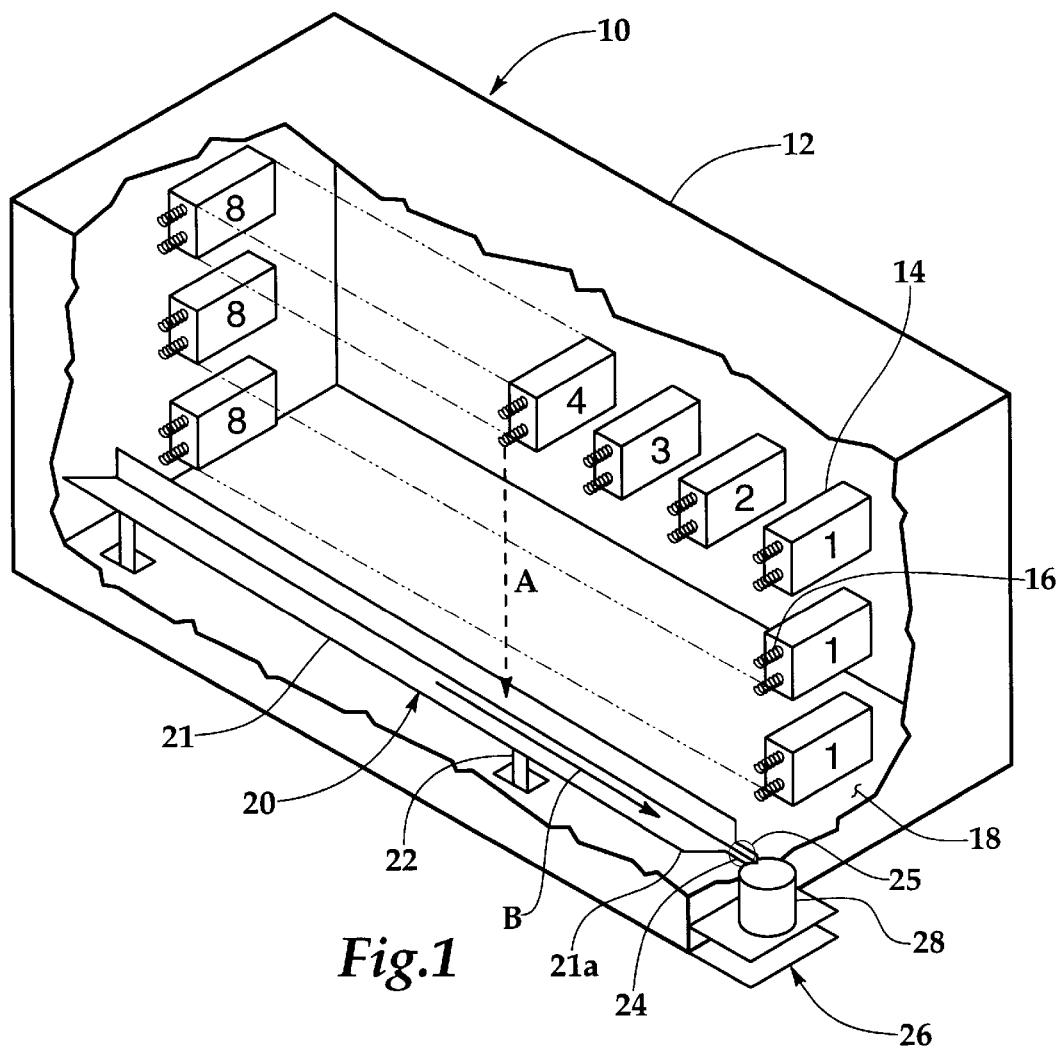
FIG. 1 is a perspective partially broken view of a capacitor bank of an electric power delivery system with the invention operably positioned therein.

Referring now to the drawings, a typical capacitor bank is shown generally at numeral 10 and is typically found in an electric power delivery system (not shown) of larger facilities, municipalities and the like. Each capacitor bank 10 includes a housing 12 and a plurality or array of individual capacitors 14 which are typically arranged as shown in FIG. 1. Each of these capacitors 14 are aligned in columns, e.g. 1 . . . 8, and include porcelain bushings 16 for wiring interconnection therebetween.

Each capacitor 14 is filled with a dielectric liquid and sealed and must remain substantially sealed and dielectric liquid leak free in order to continue to perform its function within the capacitor bank 10. A common failure mode of such capacitors 14 is caused by the loss of dielectric liquid usually from around these porcelain bushings 16. The dielectric liquid typically falls downward in the direction of arrow A to rest upon the bottom 18 of the housing 12 in undetected fashion. Failure of a leaking capacitor 14 typically occurs when at least 5% of the dielectric liquid has leaked from its intended to be sealed interior. A typical capacitor 14 contains about two and one half gallons of dielectric liquid and thus when about 16 ounces of dielectric liquid has leaked, failure will occur.

The present invention is shown at 20 and includes an elongated tray or trough 21 which is sloped downward toward lower end 21a and is sized and shaped so that virtually all of the dielectric liquid which leaks from any of the capacitors 14 downwardly typically in the direction of arrow A will collect on the tray or trough 21. Because the tray or trough 21 is sloped toward one end thereof at 21a, the dielectric liquid will flow in the direction of arrow B toward the lower end 21a.

Figure 2:
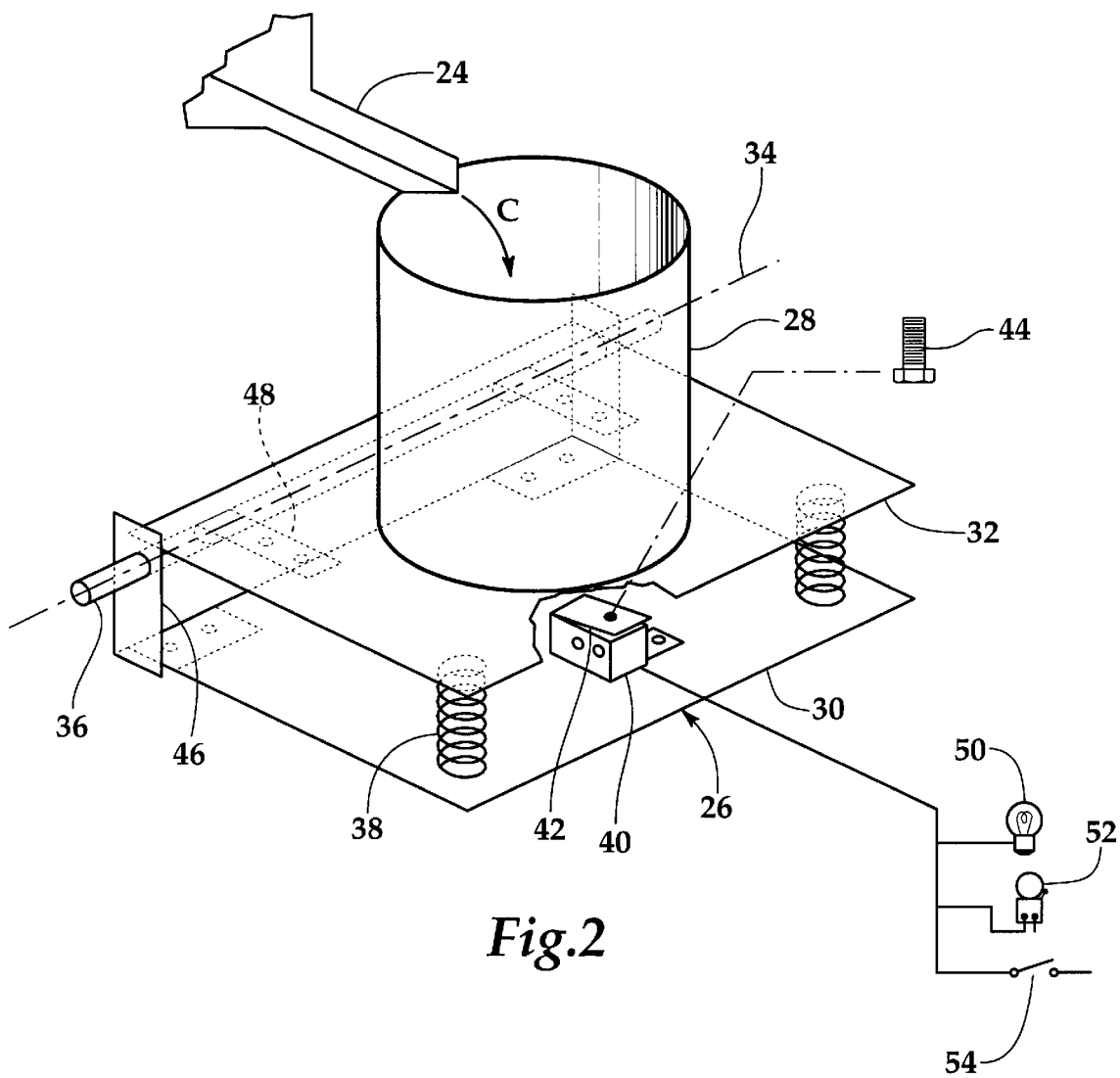
FIG. 2 is a perspective partially broken view of the liquid dielectric sensing and signal apparatus (26) of FIG. 1.

All such leaking dielectric liquid will discharge from the tray or trough 21 through outlet portion 24 which exits the housing 12 through opening 25. A dielectric liquid sensor device 26 is positioned in close proximity to the outlet portion 24 as best seen in FIG. 2. The sensor device 26 includes a container 28 positioned directly below the discharge portion 24 so that substantially all leaking dielectric liquid which has been collected on tray or trough 21 will be deposited into the container 28 in the direction of arrow C.

The sensing device 26 also includes a lower rigid plate or base 30 formed of steel or plastic sheet material and an upper plate 32 which is pivotally connected along axis 34 to the lower plate 30 by pivotal pin 36 supported by brackets 46. A protective metal enclosure such as a NEMA electrical enclosure is also provided but not shown for clarity. The pivotal pin 36 is connected to the upper plate 32 by metal straps 48.

A microswitch 40 such as that available from Radio Shack, Model #275-017 called a limit switch (ES) is positioned atop the lower plate 30 having a pivotally movable activating plate 42 thereon. An adjustable mechanical contact screw 44 threadably engaged into the upper plate 32 in alignment with contact plate 42 presses thereagainst. As dielectric liquid is accumulated in container 28, calibrated support springs 38 between the lower and upper plates 30 and 32, respectively, compress. When the upper plate 32 is pivotally moved downwardly about axis 34 a predetermined distance based upon the weight of the dielectric liquid within container 28, microswitch 40 is activated by contact 44 closing contact plate 42. When this occurs, an indicia such as a light bulb 50, an audible indicia such as a bell 52, and/or an interrupt switch 54 which disconnects all power to the leaking capacitor bank 10 is activated. Obviously when any one of these indicia has been activated, a maintenance technician will quickly be advised that a leakage problem within a particular computer bank 10 has occurred and take corrective action before damage or failure occurs.

Each of the capacitors 14 contains approximately two and one half gallons or 320 ounces of dielectric liquid. The sensing device 24 is typically calibrated to trigger when approximately four (4) ounces of dielectric liquid have been deposited into container 28. This represents a little more than approximately one percent (1%) of the total volume of dielectric liquid within each of the capacitors and well within the safe operating range thereof before any failure would occur. As previously indicated, typically about 16 ounces of dielectric liquid must leak from a capacitor 14 before a failure or electrical breakdown would occur.

Alternate sensing means may be utilized in lieu of that described with respect to FIG. 2 such as a conventional elongated collecting glass which would provide a viewable indicia to a maintenance operator that dielectric liquid leakage has occurred. However, due to the low mounting height required of the collecting tray or trough 21, positioning of such a collecting glass would be somewhat impractical. This sensing mode also requires frequent periodic monitoring and is subject to human error.

Another alternate device for sensing leakage of dielectric liquid is a float switch mounted within the collecting container 28. Such a float switch would activate one or more of the circuits described in FIG. 2 to provide indicia of impending system failure. However, typically such float switches will not sense such a small quantity of liquid as previously described because sufficient liquid is required to produce the required flotation and, additionally, the sensing switch must be immersed in the liquid electrolyte presenting maintenance and reliability problems.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. In a capacitor bank of an electric power delivery system, said capacitor bank of the type having a housing within which is positioned a plurality of spaced apart dielectric liquid filled capacitors each holding an operative quantity of dielectric liquid, the improvement is a failure protection apparatus for protecting said capacitor bank from failing due to dielectric liquid leakage comprising:

a collecting tray or trough positioned in said housing below said plurality of capacitors adapted to collect substantially all leaking said dielectric liquid which leaks from one or more of said plurality of capacitors;

said collecting tray or trough being sloped toward a liquid discharge of said tray or trough positioned at a lower end or point thereof whereby substantially all said leaking dielectric liquid flows to and out through said liquid discharge;

a dielectric liquid collecting and sensing means for collecting substantially all said leaking liquid dielectric and for activating a viewable or audible indicia means when a predetermined quantity of said leaking dielectric liquid has been collected;

said predetermined quantity substantially less than that required to have leaked from one said capacitor to cause failure of said capacitor bank.

2. The improvement for a capacitor bank as set forth in claim 1, wherein:

said dielectric liquid collecting means includes a container positioned atop a moveable spring supported surface which deflects downwardly in proportion to the quantity of said leaking dielectric liquid collected into said container;

circuit means activated by said spring supported surface when said container is filled with said predetermined quantity of said leaking dielectric liquid for activating said indicia means.

3. The improvement for a capacitor bank as set forth in claim 2, wherein:

said predetermined quantity is in the range of about one percent (1%) by volume of said operative quantity.

4. A capacitor bank failure protection apparatus adapted for producing an audible or viewable indicia prior to a detrimental leak of dielectric liquid from a capacitor bank of an electric power delivery system, said capacitor bank of the type having a housing within which is positioned a plurality of spaced apart capacitors each filled with an operative quantity of dielectric liquid, comprising:

a collecting tray or trough positioned in said housing below said plurality of capacitors adapted to collect substantially all leaking said dielectric liquid which leaks from one or more of said plurality of capacitors;

said collecting tray or trough being sloped toward a liquid discharge of said tray or trough positioned at a lower end or point thereof whereby substantially all said leaking dielectric liquid flows to and out through said liquid discharge;

a dielectric liquid collecting and sensing means for collecting substantially all said leaking liquid dielectric and for activating a viewable or audible indicia means when a predetermined quantity of said leaking dielectric liquid has been collected;

said predetermined quantity substantially less than that required to have leaked from one said capacitor to cause failure of said capacitor bank.

5. A capacitor bank failure protection apparatus as set forth in claim 4, wherein:

said dielectric liquid collecting means includes a container positioned atop a moveable spring supported surface which deflects downwardly in proportion to the quantity of said leaking dielectric liquid collected into said container;

circuit means activated by said spring supported surface when said container is filled with a predetermined quantity of said leaking dielectric liquid for activating said indicia means.

6. A capacitor bank failure protection apparatus as set forth in claim 5, wherein:

said predetermined quantity is in the range of about one percent (1%) by volume of said operative quantity.

7. In a capacitor bank of an electric power delivery system, said capacitor bank of the type having a housing within which is positioned a plurality of spaced apart dielectric liquid filled capacitors each holding an operative quantity of dielectric liquid, each said capacitor including porcelain bushings for wiring interconnection, a failure protection apparatus for protecting said capacitor bank from failure due to dielectric fluid leakage, comprising:

an elongated collecting tray or trough positioned in said housing directly below each said porcelain bushing of said plurality of capacitors adapted to collect substantially all leaking said dielectric liquid which leaks from close proximity to one or more of said porcelain bushings;

said collecting tray or trough being sloped toward a liquid discharge of said tray or trough positioned at a lower end or point thereof whereby substantially all said leaking dielectric liquid flows to and out through said liquid discharge;

a dielectric liquid collecting and sensing means for collecting substantially all said leaking liquid dielectric and for activating a viewable or audible indicia means when a predetermined quantity of said leaking dielectric liquid has been collected;

said predetermined quantity being a predetermined non-critical amount of said dielectric liquid in one said capacitor.

8. A capacitor bank failure protection apparatus as set forth in claim 7, wherein:

said dielectric liquid collecting means includes a container positioned atop a moveable spring supported surface which deflects downwardly in proportion to the quantity of said leaking dielectric liquid collected into said container;

circuit means activated by said spring supported surface when said container is filled with a predetermined quantity of said leaking dielectric liquid for activating said indicia means.

9. A capacitor bank liquid dielectric leak sensor for a capacitor bank as set forth in claim 8, wherein:

said predetermined quantity is in the range of about one percent (1%) by volume of said operative quantity.

10. A failure protection apparatus adapted for producing an audible or viewable indicia prior to a detrimental leak of dielectric liquid in a capacitor bank of an electric power delivery system, said capacitor bank of the type having a housing within which is positioned a plurality of spaced apart capacitors each filled with an operative quantity of dielectric liquid, each said capacitor including porcelain covered output terminals for external wiring connection thereto, comprising:

an elongated collecting tray or trough positioned in said housing directly below said output terminals adapted in size to collect substantially all leaking said dielectric liquid which leaks from the close vicinity of one or more of said output terminals;

said collecting tray or trough being sloped toward a liquid discharge of said tray or trough positioned at a lower end or point thereof whereby substantially all said leaking dielectric liquid flows to and out through said liquid discharge;

a dielectric liquid collecting and sensing means for collecting substantially all said leaking liquid dielectric and for activating a viewable or audible indicia means when a predetermined quantity of said leaking dielectric liquid has been collected;

said predetermined quantity being a predetermined non-critical amount of said dielectric liquid in one said capacitor.

11. A failure protection apparatus as set forth in claim 10, wherein:

said dielectric liquid collecting means includes a container positioned atop a moveable spring support surface which deflects downwardly in proportion to the quantity of said leaking dielectric liquid collected into said container;

circuit means activated by said spring supported surface when said container is filled with a predetermined quantity of said leaking dielectric liquid for activating said indicia means.

12. A failure protection apparatus as set forth in claim 11, wherein: said predetermined quantity is in the range of about one percent (1%) by volume of said operative quantity.

* * * * *